United States Patent
Watanabe

(10) Patent No.: US 10,949,699 B2
(45) Date of Patent: Mar. 16, 2021

(54) INPUT APPARATUS HAVING CHARACTER RECOGNITION FUNCTION FOR RECOGNIZING INPUT HANDWRITING, AND INPUT METHOD AND STORAGE MEDIUM WITH PROGRAM STORED THEREON HAVING SAME

(71) Applicant: CASIO COMPUTER CO., LTD., Tokyo (JP)

(72) Inventor: Tohru Watanabe, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 90 days.

(21) Appl. No.: 16/359,666

(22) Filed: Mar. 20, 2019

(65) Prior Publication Data
US 2019/0294911 A1 Sep. 26, 2019

(30) Foreign Application Priority Data
Mar. 23, 2018 (JP) .............................. JP2018-056327

(51) Int. Cl.
*G06K 9/46* (2006.01)

(52) U.S. Cl.
CPC ............ *G06K 9/46* (2013.01); *G06K 2209/01* (2013.01)

(58) Field of Classification Search
CPC ... G06K 9/46; G06K 2209/01; G06K 9/00422
See application file for complete search history.

(56) References Cited

U.S. PATENT DOCUMENTS

| 7,929,767 | B2 * | 4/2011 | Xu ........................... G06K 9/72 382/186 |
| 8,619,045 | B2 | 12/2013 | Yoshizawa |
| 9,019,308 | B2 * | 4/2015 | Karoji ............... G06K 9/00402 345/636 |
| 2002/0126905 | A1 * | 9/2002 | Suzuki ................ G06K 9/6835 382/229 |
| 2006/0062466 | A1 * | 3/2006 | Zou ....................... G06K 9/222 382/186 |
| 2008/0260240 | A1 * | 10/2008 | Vukosavljevic ... G06K 9/00436 382/159 |
| 2009/0304283 | A1 * | 12/2009 | Predovic ............ G06K 9/00463 382/189 |
| 2013/0054222 | A1 * | 2/2013 | Sharma ............. G06K 9/00442 704/2 |
| 2014/0184610 | A1 * | 7/2014 | Shibata .............. G06K 9/00422 345/441 |
| 2014/0270384 | A1 * | 9/2014 | Nepomniachtchi ......................... G06K 9/00442 382/104 |

(Continued)

FOREIGN PATENT DOCUMENTS

| JP | 2007133850 A | 5/2007 |
| JP | 2010211656 A | 9/2010 |

*Primary Examiner* — Ming Y Hon
(74) *Attorney, Agent, or Firm* — Holtz, Holtz & Volek PC

(57) ABSTRACT

An input apparatus performs character recognition on trajectory data that is input by handwriting, determines whether or not an order of recognized characters complies with a rule on mathematical representations, and if it is determined that the recognized characters, except for a first character at any position in a sequence of the characters, comply with the rule, replaces the first character with a second character that complies with the rule.

15 Claims, 4 Drawing Sheets

(56) References Cited

U.S. PATENT DOCUMENTS

2016/0314348 A1* 10/2016 Wang ................. G09B 5/02
2017/0091597 A1*  3/2017 Wolfram ............ G06K 9/00442
2017/0364744 A1* 12/2017 Savchenkov ............ G06T 7/13
2018/0357207 A1* 12/2018 Yi ..................... G06F 40/131

\* cited by examiner

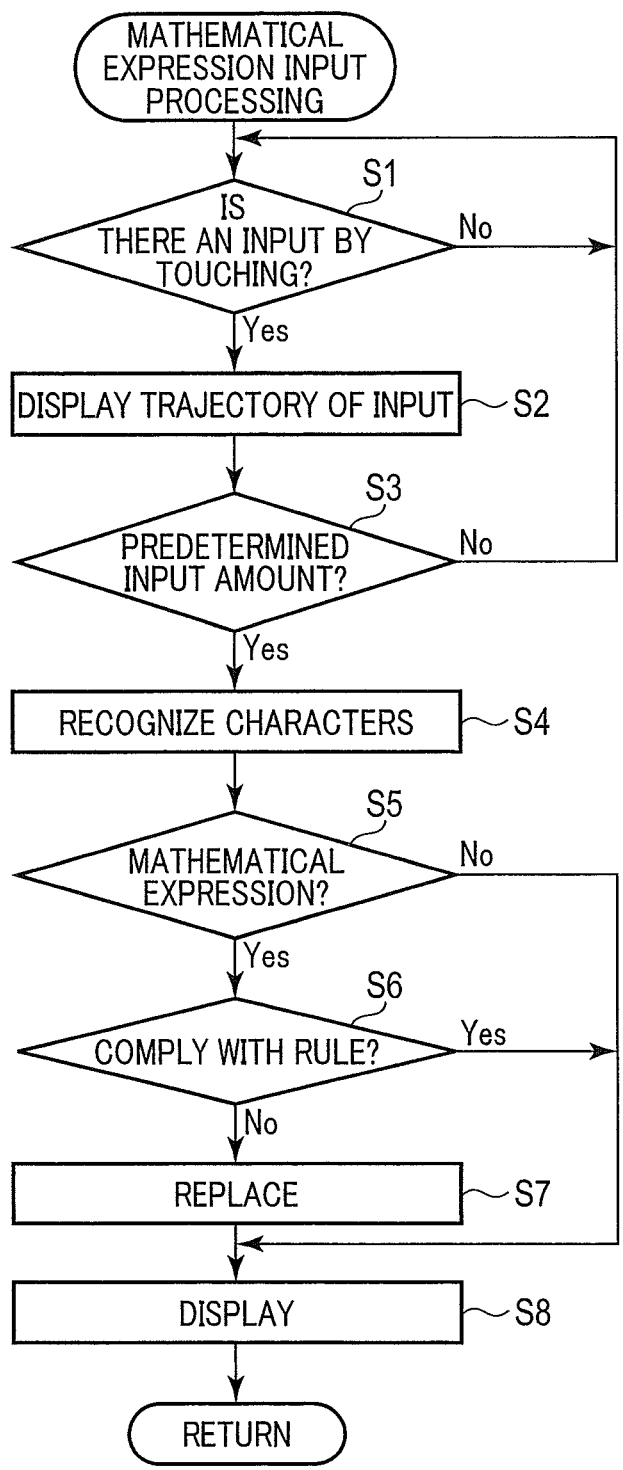
F I G. 2

INPUT APPARATUS HAVING CHARACTER RECOGNITION FUNCTION FOR RECOGNIZING INPUT HANDWRITING, AND INPUT METHOD AND STORAGE MEDIUM WITH PROGRAM STORED THEREON HAVING SAME

CROSS-REFERENCE TO RELATED APPLICATION

This application is based upon and claims the benefit of priority from prior Japanese Patent Application No. 2018-056327, filed Mar. 23, 2018, the entire contents of which are incorporated herein by reference.

BACKGROUND OF THE INVENTION

1. Field of the Invention

The present invention relates to an input apparatus, an input method, and a storage medium which are suitable for inputting handwritten mathematical representations.

2. Description of the Related Art

Various techniques of recognizing handwritten character have been proposed.

For example, a technique of recognizing a target character by assuming the character from its shape, and a technique of recognizing a target character in a character string, such as a sentence or text, by assuming the character from a word that includes characters that precedes and follows the target character.

Patent Literature 1: Jpn. Pat. Appln. KOKAI Publication No. 2007-133850

A word processor allows a user to easily input desired characters that constitute a sentence or text as correctly-input character data, compared to a case of inputting characters by handwriting, which requires character recognition.

SUMMARY OF THE INVENTION

An aspect of the present invention is an input apparatus comprising a processor, the processor configured to perform character recognition on trajectory data that is input by handwriting, and to determine whether or not a plurality of characters obtained by the character recognition, except for a first character at any position in a sequence of the characters, comply with a rule relating to mathematical representations, and if the plurality of characters except for the first character comply with the rule, to replace the first character with a second character that complies with the rule.

Another aspect of the present invention is an input method, the method comprising: performing, by an apparatus, character recognition on trajectory data that is input by handwriting; and determining by the apparatus whether or not a plurality of characters obtained by the character recognition, except for a first character at any position in a sequence of the characters, comply with a rule relating to mathematical representations, and if the plurality of characters except for the first character comply with the rule, replacing by the apparatus the first character with a second character that complies with the rule.

Another aspect of the present invention is a non-transitory storage medium storing a program to cause a computer to: perform character recognition on trajectory data that is input by handwriting; and determine whether or not a plurality of characters obtained by the character recognition, except for a first character at any position in a sequence of the characters, comply with a rule relating to mathematical representations, and if the plurality of characters except for the first character comply with the rule, replace the first character with a second character that complies with the rule.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 2 is a flowchart of a mathematical expression input process in the tablet device 10 in accordance with programs 12a, 12b, and 12c.

DETAILED DESCRIPTION OF THE PREFERRED EMBODIMENTS

Embodiments of the present invention will be described hereinafter with reference to the accompanying drawings.

To input mathematical representations such as a mathematical expression as data with the above-described conventional techniques, it is necessary to find characters and symbols that a user wants to input from a variety of characters and symbols used in mathematical representations, even if a tool dedicated for inputting mathematical representations is used. For this reason, such conventional techniques require time and effort.

Under such circumstances, there have been needs for correctly recognizing mathematical representations, such as mathematical expressions, that are input by handwriting without a user's effort, and converting the correctly-recognized characters and symbols into data.

A tablet device 10 as a mathematical expression input device according to an embodiment of the present invention adopts a configuration, which will be described below, in order to improve accuracy of recognition of mathematical representations that are input by handwriting.

Figure 1:
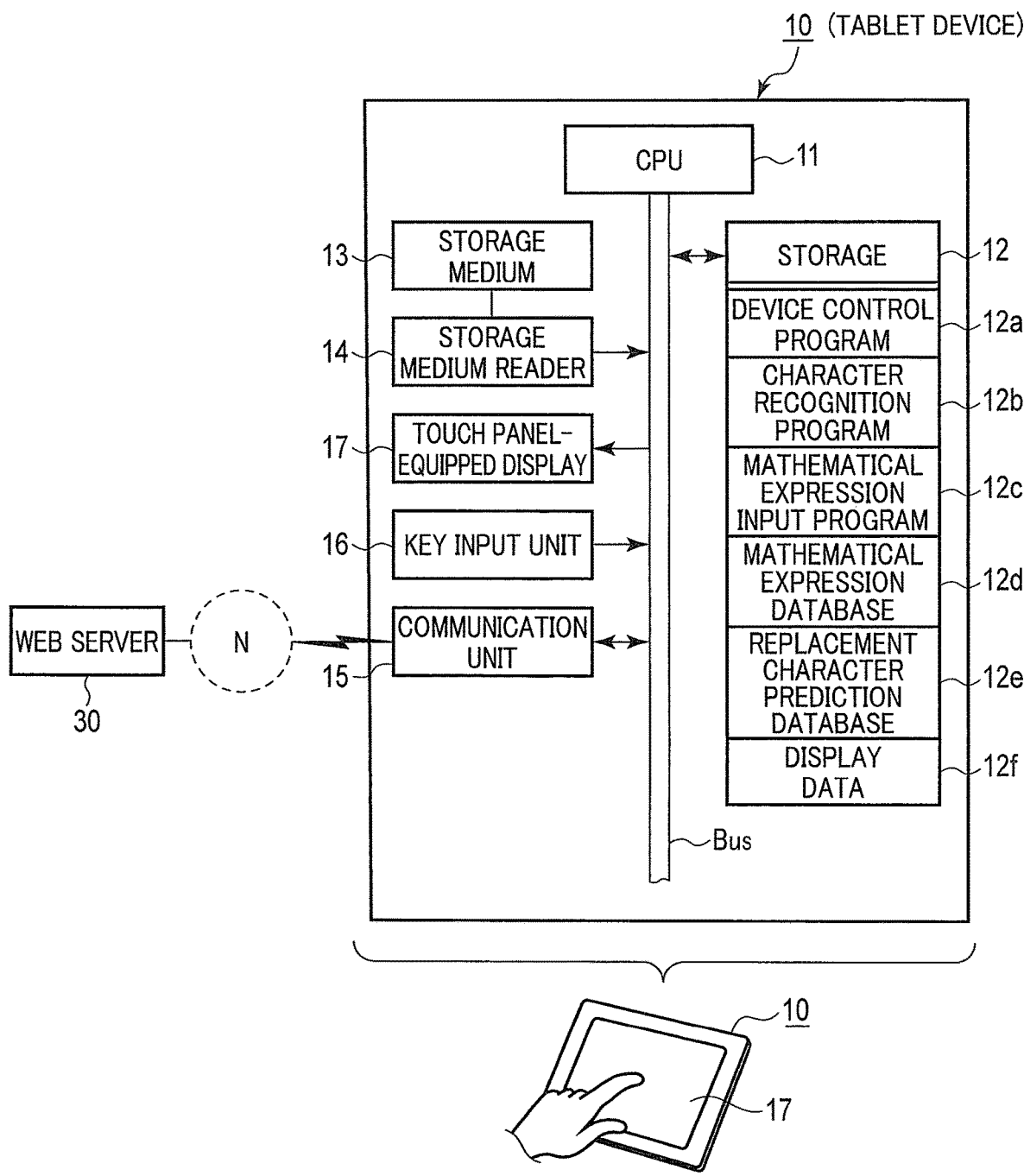
FIG. 1 is a block diagram showing a configuration of a tablet device 10 as a mathematical expression input apparatus according to embodiments of the present invention.

FIG. 1 is a block diagram showing a configuration of electronic circuitry of a tablet device 10 as a mathematical expression input apparatus according to embodiments of the present invention.

The tablet device 10 includes a CPU (processor) 11 as a controller.

The CPU 11 controls an operation of each circuitry component in accordance with a program pre-stored in a storage 12, a program that is read from an external storage medium 13, such as a memory card, by a storage medium reader 14 and stored in the storage 12, or a program downloaded from a Web server 30 (herein a program server) on a communication network N through a communication unit 15 and stored in (installed on) the storage 12.

The CPU 11 is connected to a key input unit 16, and a touch panel-equipped display 17, besides the storage 12, the storage medium reader 14, and the communication unit 15, via system and control buses Bus.

The storage 12 stores for example, as data of the programs, a terminal control program 12a for controlling an overall operation of the tablet device (mathematical expression input device) 10, a character recognition program 12b for recognizing characters (including symbols) that are input by handwriting to the touch panel-equipped display 17 and converting the recognized characters into character codes for input, a mathematical expression input program 12c for converting, in conjunction with the character recognition program 12b, a mathematical expression (mathematical representation) that is input by handwriting to the touch panel-equipped display 17 into character codes of characters (including mathematical symbols) that constitute the mathematical expression, and the like.

The storage 12 also stores a mathematical expression database 12d, a replacement character prediction database 12e, and display data 12f, etc.

The mathematical expression database 12d stores various rules on mathematical representations for determining whether or not a recognized mathematical expression (mathematical representation) that is input by handwriting to the touch panel-equipped display 17 is input as a correct mathematical representation (whether the input mathematical representation holds or not as a mathematical expression).

Examples of the rules on mathematical representations are given in (1) and (2) below.
(1) Rules on Order of Characters and Symbols in Mathematical Representations:

Different numbers are not connected by an equal sign (=)

Different numbers may be connected by a congruence sign (≡)

A variable in an equation is often placed on the left side

The left and right sides of an equation are not connected by an angle sign (∠)

The left and right sides of an equation may be connected by an unequal sign (≠)
(2) Rules on Use Levels of Mathematical Representations:

Mathematical symbols used in a beginner level (elementary school)

Mathematical symbols used in an intermediate level (junior high school)

Mathematical symbols used in an advanced level (high school and university)

The rules on order of characters and symbols in mathematical representations as illustrated in (1) above are prepared and stored for each mathematical notation (infix notation, Polish notation, Reverse Polish notation, for example).

The replacement character prediction database 12e stores characters and symbols similar to each character (symbol) in ascending order of similarity. If a character (symbol) in the recognized mathematical expression (mathematical representation) that is input by handwriting does not comply with a rule corresponding to the mathematical representation, the character is replaced with a character that complies with the rules based on the replacement character prediction database 12e.

The display data 12f is data in a form of a bit map in which data to be displayed on the touch panel-equipped display 17 is expanded.

In the tablet device 10 (mathematical expression input apparatus) configured as described above, the CPU 11 controls the operations of the respective circuitry components according to the instructions described in the terminal control program 12a, the character recognition program 12b, and the mathematical expression input program 12c, and the software and hardware cooperate to realize a mathematical expression input function, which will be described in the descriptions of operations below.

Next, operations of the tablet device 10 (mathematical expression input device) configured as described above are described below.

FIG. 2 is a flowchart of mathematical expression input processing in accordance with programs 12a, 12b, and 12c in the tablet device 10.

First Embodiment

Figure 3:
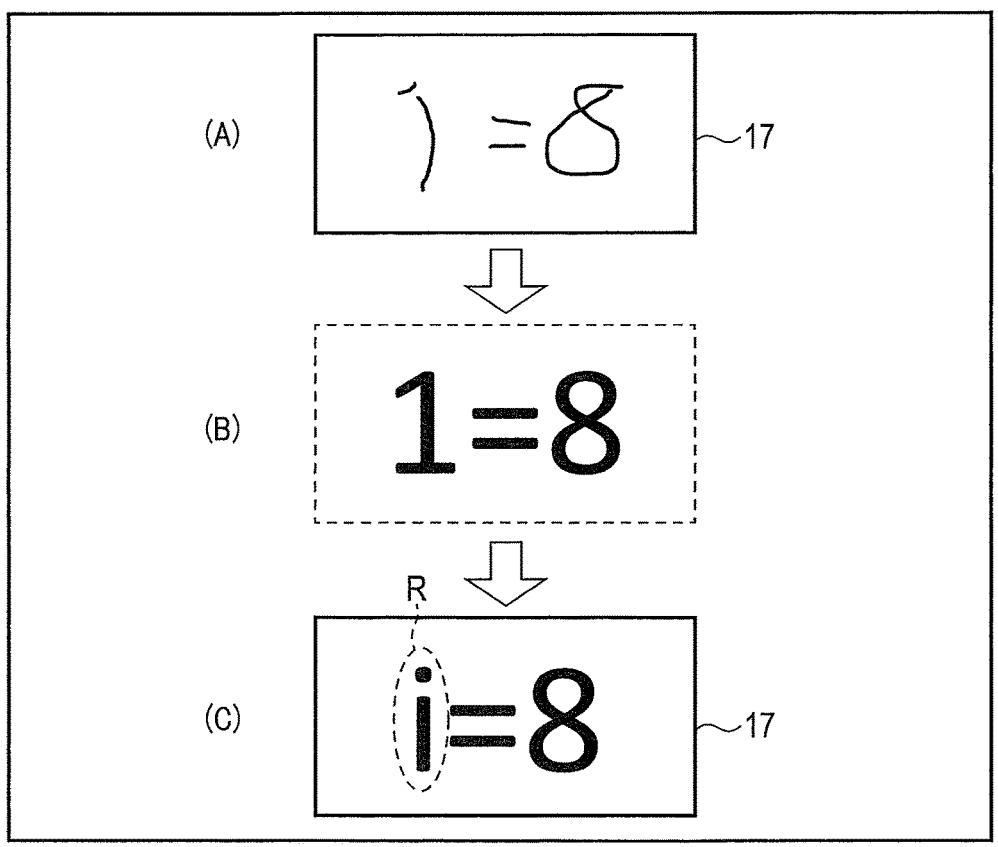
FIG. 3 is a diagram showing a display operation in a first embodiment in accordance with the mathematical expression input processing in the tablet device 10.

FIG. 3 is a diagram showing a display operation in the first embodiment in accordance with the mathematical expression input processing in the tablet device 10.

In the tablet device 10, as shown in (A) of FIG. 3, when a mathematical expression "i=8" is input by a user, for example, the touch panel-equipped display 17 is operated by touching, and "i" "=" "8" are input by handwriting ("Yes" in step S1), and the CPU 11 then detects a location where the touch panel-equipped display 17 is touched, and causes the display 17 to display a trajectory of the touch (step S2).

Herein, for example, if it is determined that an input amount reaches a predetermined input amount when the location of the touch detected in the touch panel-equipped display 17 is moved to a location corresponding to a line break ("Yes" in step S3), the CPU 11 recognizes the characters (symbols) of the mathematical expression that has been input by handwriting, "i" "=" and "8", as "1" "=" "8", as shown in (B) of FIG. 3 (step S4).

Then, the CPU 11 determines whether or not the character string is a mathematical expression by determining, for example, whether or not the recognized character string includes a mathematical symbol (step S5). At this time, if the character string is determined as a mathematical expression, the notation of the mathematical expression (for example, infix notation, Polish notation, Reverse Polish notation) is also determined.

If the recognized character string "1" "=" "8" is determined as a mathematical expression because of the equal sign included therein, ("Yes" in step S5), it is determined whether or not the character string complies with the rules on mathematical representations (infix notation) stored in the mathematical expression database 12d (step S6).

For the character string "1" "=" "8" of the recognized mathematical expression, if it is determined that the character string does not comply with the rule relating to the order the characters and symbols in mathematical representations (infix notation), "different numbers are not connected by an equal sign" ("No" in step S6), the CPU 11 determines that the number "1" on the left side of the mathematical expression is erroneously recognized. Furthermore, the CPU 11 retrieves "i" as a character (Latin or Greek alphabetical characters), which may be used as a variable, from characters that are stored in the replacement character prediction database 12e and that have high similarities with the erroneously-recognized "1", and replaces "1" with "i" (step S7).

As shown in (C) of FIG. 3, the CPU 11 causes the touch panel-equipped display 17 to display the character string after the replacement of "1" with "i", that is, "i" "=" "8", with the replaced character "i" being displayed in red R (or in a display manner different from the other characters) so that the replaced character can be distinguished (step S8).

It is thereby possible for the user to input a mathematical expression "i=8" by handwriting, have the apparatus recognize and display the desired mathematical expression as intended, thereby becoming capable of automatically marking a handwritten answer for a mathematic examination, for example.

In step S4 and step S5, if it is determined that the recognized character string is not a mathematical expression ("No" in step S5), the CPU 11 causes the touch panel-equipped display 17 to display the recognized character string as it is (step S8).

In step S4 through step S6, if it is determined that the recognized character string complies with any of the rules relating to the order of characters and symbols in mathematical representations ("Yes" in step S6), the CPU 11 causes the touch panel-equipped display 17 to display the recognized character string as it is (step S8).

Second Embodiment

Figure 4:
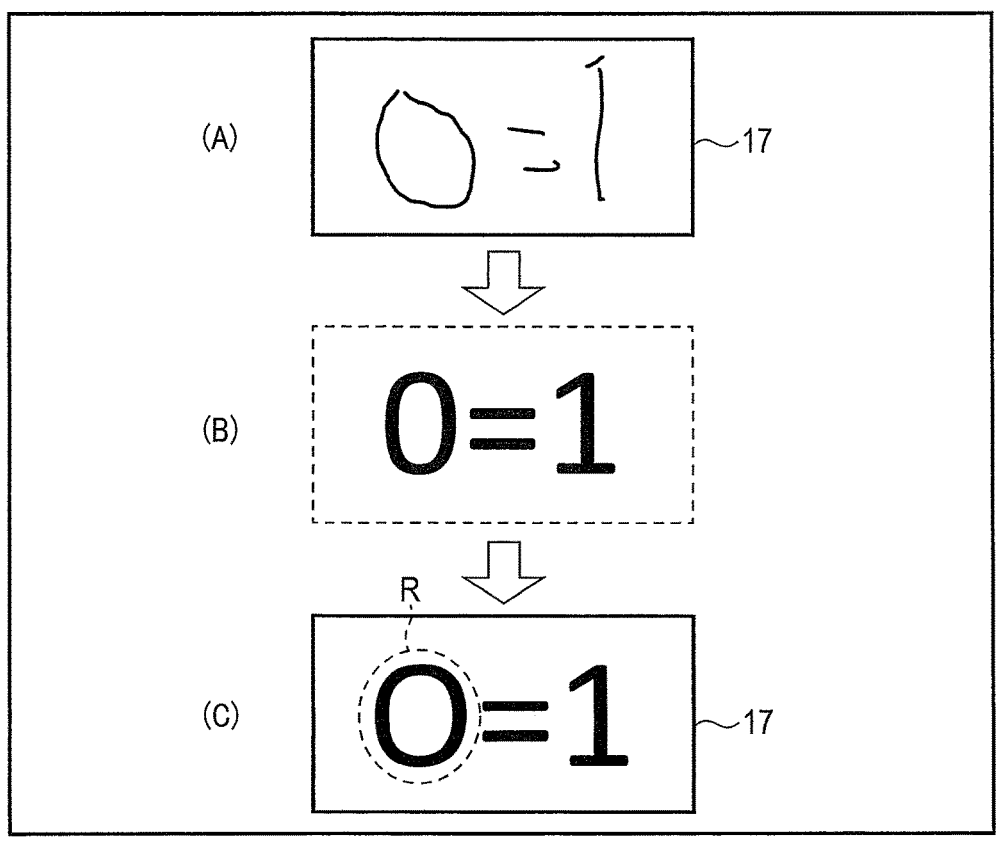
FIG. 4 is a diagram showing a display operation of a second embodiment in accordance with the mathematical expression input processing in the tablet device 10.

FIG. 4 is a diagram showing a display operation in the second embodiment in accordance with the mathematical expression input processing in the tablet device 10.

Similar to the first embodiment (see FIG. 3), in the tablet device 10, as shown in (A) of FIG. 4, when a mathematical expression "O=1" is input by a user, for example, the touch panel-equipped display 17 is operated by touching, and "O" "=" and "1" are input by handwriting ("Yes" in step S1), and the CPU 11 then detects a location of the input by touching, and causes the display 17 to display a trajectory of the input (step S2).

The CPU 11 recognizes each of the characters (symbols), "O" "=" "1" in the mathematical expression that is input by handwriting as "0" "=" "1" as shown in (B) of FIG. 4 (step S3 and step S4).

The CPU 11 determines that the recognized character string "0" "=" "1" is a mathematical expression because of the equal sign included therein, ("Yes" in step S5), and determines whether or not the character string complies with the rules on mathematical representations (infix notation) stored in the mathematical expression database 12d (step S6).

Similarly to the first embodiment, the recognized character string "0" "=" "1" is determined not to comply with the rule relating to the order of characters and symbols in mathematical representations (infix notation), "different numbers are not connected by an equal sign" ("No" in step S6).

The CPU 11 determines that the "0" on the left side of the mathematical expression "0" "=" "1" is erroneous recognition based on the rule relating to the order of characters and symbols in mathematical representations (infix notation) that "different numbers are not connected by an equal sign".

Furthermore, the CPU 11 retrieves "O" as a character (Latin or Greek alphabetical characters) used for variables from characters that are stored in the replacement character prediction database 12e and that have high similarities with the erroneously-recognized "0", and replaces "0" with "O" (step S7).

As shown in (C) of FIG. 4, the CPU 11 causes the touch panel-equipped display 17 to display the character string after the replacement, "O" "=" "1", with the replaced character "O" being displayed in red R (or in a display manner different from the other characters) so that the replaced character can be distinguished (step S8).

It is thereby possible for the user to input a mathematical expression "0=1" by handwriting, and have the apparatus recognize and display the desired mathematical expression as intended.

Third Embodiment

Figure 5:
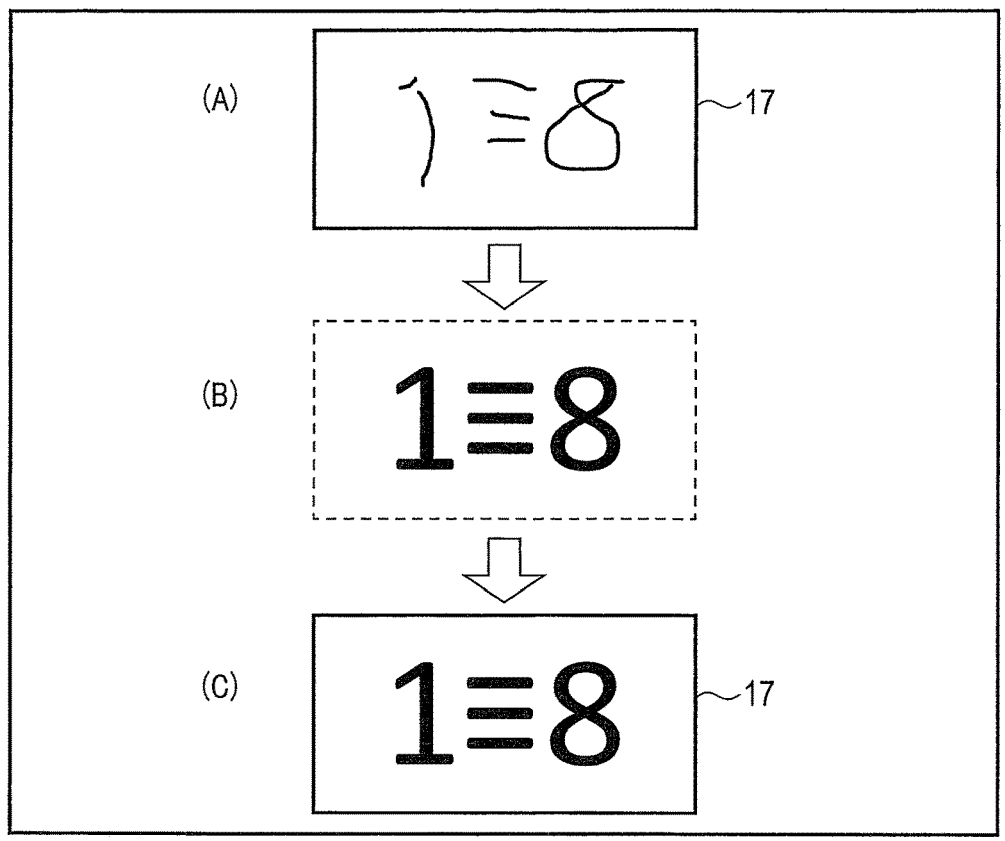
FIG. 5 is a diagram showing a display operation of a third embodiment in accordance with the mathematical expression input processing in the tablet device 10.

FIG. 5 is a diagram showing a display operation in the third embodiment in accordance with the mathematical expression input processing in the tablet device 10.

Similar to the foregoing embodiments, in the tablet device 10, as shown in (A) of FIG. 5, when a mathematical expression "1 ≡8" is input by a user, for example, the touch panel-equipped display 17 is operated by touching, and "1" "≡" "8" are input by handwriting ("Yes" in step S1), and the CPU 11 then detects a location of the input by touching, and causes the display 17 to display a trajectory of the input (step S2).

The CPU 11 recognizes each of the characters (symbols), "1" "≡" "8" in the mathematical expression that is input by handwriting as "1" "≡" "8" as shown in (B) of FIG. 5 (step S3 and step S4).

The CPU 11 determines that the recognized character string "1" "≡" "8" is a mathematical expression because of the congruence sign included therein, ("Yes" in step S5), and determines whether or not the character string complies with the rules on mathematical representations (infix notation) stored in the mathematical expression database 12d (step S6).

Herein, the recognized character string "1" "≡" "8" is determined to comply with the rule relating to the order of characters and symbols in mathematical representations (infix notation), "different numbers may be connected by a congruence sign" ("Yes" in step S6).

As shown in (C) of FIG. 5, the CPU 11 causes the touch panel-equipped display 17 to display the recognized character string "1" "≡" "8" as it is (step S8).

Fourth Embodiment

In the tablet device 10, when a mathematical expression "A≠B" is input by a user, for example, the touch panel-equipped display 17 is operated by touching, and "A", "≠", and "B" are input by handwriting ("Yes" in step S1), and the CPU 11 then detects a location of the input by touching, and causes the display 17 to display a trajectory of the input (step S2).

The CPU 11 recognizes each of the characters (symbols) in the mathematical expression that is input by handwriting, "A" "≠" "B", as "A" "∠" "B" (step S3 and step S4).

The CPU 11 determines that the recognized character string "A" "∠" "B" is a mathematical expression because it includes an angle sign therein ("Yes" in step S5), and determines that the character string "A" "∠" "B" does not comply with the rule regarding the order of characters and symbols in mathematical representations (infix notation) stored in the mathematical expression database 12d, "the left and right sides of an equation are not connected by an angle sign" ("No" in step S6).

The CPU 11 determines that the symbol (an angle sign) "∠" in the character string "A" "∠" "B" is erroneous recognition based on the rule relating to the order of characters and symbols in mathematical representations (infix notation), "the left and right sides of an equation may be connected by an unequal sign". Then, the CPU 11 retrieves an unequal sign from the characters (symbols) having high similarity with the erroneously recognized symbol "∠" stored in the replacement character prediction database 12e, and replaces the erroneously recognized symbol "∠" with the retrieved symbol "≠" (step S7).

The CPU 11 causes the touch panel-equipped display 17 to display the character string after the replacement, "A" "≠" "B", with the replaced character "≠" being displayed in red R (or in a display manner different from the other characters) so that the replaced character can be distinguished (step S8).

It is thereby possible for the user to input a mathematical expression "A≠B" by handwriting, and have the apparatus recognize and display the desired mathematical expression as intended.

According to the tablet device 10 (mathematical expression input apparatus) having the configuration as described above, a character string that is input by handwriting to the touch panel-equipped display 17 is recognized, and if the recognized character string is a mathematical expression including a mathematical sign, it is determined whether the character string complies with any of the rules on mathematical representations. If there is a character that does not comply with the rules on mathematical expressions in the recognized character string, the character is replaced with a character that is predicted to comply with the rules and the character string is displayed.

Therefore, it is possible to improve accuracy in recognition of mathematical representations that are input by handwriting.

According to the tablet device 10 (mathematical expression input apparatus) having the configuration as described above, if a character that does not comply with the rule on mathematical representations in the recognized character string is replaced with a character predicted to comply with the rule, the replaced character is displayed in a distinguishable manner (in a display manner different from the other characters in the recognized character string), so that the user can be notified of the replacement.

In each of the embodiments, if (2) "rules on use levels of mathematical representations" stored in the mathematical expression database 12d is used along with the rules on mathematical representations, it is possible to narrow down the number of types of mathematical signs that may be used in a mathematical representation, in accordance with a designated use level (e.g., a beginner level (elementary school)/an intermediate level (junior high school)/an advanced level (high school and university))). If a character (mathematical sign) that would not be used in the designated use level is recognized, the determined character (sign) is determined as erroneous recognition and can be replaced. It is therefore possible to improve accuracy in recognition of mathematical expressions that are input by handwriting.

Figure 6:
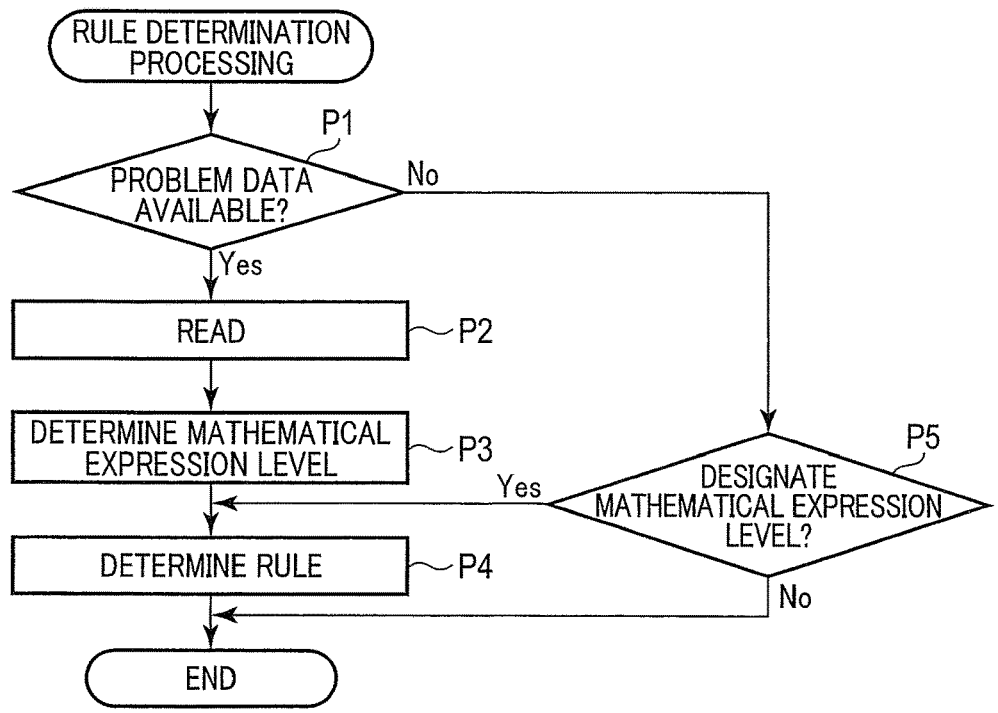
FIG. 6 is a flowchart showing rule determination processing for determining rules on use levels of mathematical representations when the mathematical expression input processing is performed in the tablet device 10.

FIG. 6 is a flowchart showing rule determination processing for determining rules on use levels of mathematical representations when the mathematical expression input processing is performed in the tablet device 10.

In a case that requires a handwritten input of a mathematical expression by a user as described in each of the foregoing embodiments on the assumption that problem data for mathematics examination is distributed to the tablet device 10 of each user ("Yes" in step P1), the CPU 11 reads and analyzes the problem data (step P2), determines a mathematical expression level corresponding to the problem data (for example, a grade level that appears in a textbook) (step P3), and determines the rules on use levels of mathematical representations (step P4).

If the problem data for the mathematics examination is not distributed ("No" in step P1), the mathematical expression level is designated by a user's operation ("Yes" in step P5), and a rule on use levels of mathematical representations is determined (step P4).

It is of course possible to further improve accuracy in recognition of mathematical expressions (mathematical representations) that are input by handwriting by updating the rules on mathematical representations stored in the mathematical expression database 12d through machine learning, for example.

Other Modifications

The tablet terminal 10 (mathematical expression apparatus) may be configured as follows: the processor recognizes trajectory data that is input by handwriting, and determines whether or not the order of the recognized characters complies with the rules on mathematical representations, and if the recognized characters except for the first character comply with the rule, the processor replaces the first character with a second letter that complies with the rule.

The tablet terminal 10 may be configured as follows: if the plurality of characters except for the first character comply with the rule, the processor selects a character that complies with the rule as the second character from a plurality of recognition candidate characters corresponding to trajectory data of the first character.

The tablet terminal 10 may be configured as follows: the processor selects, as the second character, a character that complies with the rule and that has a highest similarity with the trajectory data from a plurality of recognition candidate characters corresponding to the trajectory data of the first character.

The tablet terminal 10 may be configured as follows: the processor determines the types of each of the characters in the mathematical representation, selects a first rule with which the first character among the characters complies from a plurality of rules defining an order of types of the characters used in mathematical representations, specifies a type of the first character that complies with the selected first rule, and replaces the first character with the second character which is a character corresponding to the determined type.

The tablet terminal 10 may be configured as follows: the processor selects, as the second character, a character corresponding to a type of the specified character from a plurality of recognition candidate characters corresponding to the trajectory data of the first character.

The tablet terminal 10 may be configured as follows: the types of characters in the mathematical expression may include a type corresponding to a character that may be a candidate for a variable, a type corresponding to characters that may be candidate for mathematical signs, and a type corresponding to characters that may be numbers.

The methods of the respective processes used by the tablet device 10 (mathematical expression input apparatus), which have been described in each of the above embodiments, that is, the methods of the mathematical expression input process illustrated in the flowchart of FIG. 2 and the rule determination process illustrated in the flowchart of FIG. 6, can be stored as CPU (processor)-executable programs in a medium such as a memory card (ROM card, RAM card, etc.), a magnetic disk (floppy (trademark) disk, hard disk, etc.), an optical disc (CD-ROM, DVD, etc.), or a semiconductor memory, and can be distributed. Furthermore, a computer (CPU) of an electronic device comprising a handwriting input function reads the program stored in the external storage medium, and the operations can be executed and controlled based on the read programs, thereby realizing the mathematical expression input function described in the embodiments, and executing processing similar to the above-described processes.

The data of the programs for realizing each of the above-described processes can be transmitted on a communication network (N) in a form of program codes, and data of the programs can be obtained from a program server (30) connected to this communication network (N) and imported to an electronic device comprising a handwriting input function, and stored in a storage apparatus, thereby realizing the aforementioned mathematical expression input function.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An input apparatus comprising:
a processor that is configured to:
perform character recognition on trajectory data that is input by handwriting; and
determine whether or not a plurality of characters obtained by the character recognition, except for a first character at any position in a sequence of the characters, comply with a rule relating to mathematical representations, and if the plurality of characters except for the first character comply with the rule, replace the first character with a second character that complies with the rule,
wherein:
the rule includes a rule that defines an order of numerical characters, characters corresponding to variables, and mathematical symbols; and
the rule defines an order of a character on a left side, a mathematical symbol, and a character on a right side in a mathematical representation, and includes at least one of the following:
a rule that different numbers on a left side and a right side are not connected by an equal sign (=);
a rule that different numbers on a left side and a right side may be connected by a congruence symbol (≡);
a rule that a variable may be placed on a left side of an equation;
a rule that a left side and a right side of an equation are not connected by an angle sign (∠); and
a rule that a left side and a right side of an equation may be connected by an unequal sign (≠).

2. The input apparatus according to claim 1, wherein if the plurality of characters except for the first character comply with the rule, the processor selects a character that complies with the rule as the second character from a plurality of recognition candidate characters corresponding to trajectory data of the first character.

3. The input apparatus according to claim 2, wherein the processor selects, from the plurality of recognition candidate characters corresponding to trajectory data of the first character, a character with highest similarity with the trajectory data among the plurality of recognition candidate characters as the second character.

4. The input apparatus according to claim 1, wherein the processor is configured to:
determine a type of each of the characters in a mathematical notation;
select a first rule with which the characters except for the first character comply from a plurality of rules that define an order of types of characters in a mathematical representation based on a result of the determination;
specify a type of the first character that complies with the selected first rule; and
replace the first character with the second character that corresponds to the specified type.

5. The input apparatus according to claim 4, wherein the processor selects, as the second character, a character corresponding to a type of the specified character from a plurality of recognition candidate characters corresponding to trajectory data of the first character.

6. The input apparatus according to claim 4, wherein a type of character in the mathematical expression includes:
a type corresponding to a character that may be a candidate for variables,
a type corresponding to a character that may be a candidate for mathematical signs, and
a type corresponding to a character that may be a candidate for numerical characters.

7. The input apparatus according to claim 1, further comprising a touch panel-equipped display,
wherein the processor is configured to:
input data of a handwritten trajectory in accordance with a user's operation on the touch panel-equipped display, and display the handwritten trajectory on the touch panel-equipped display;
if it is determined that an order of the recognized characters complies with the rule, cause the touch panel-equipped display to display the characters; and
if it is determined that the characters except for the first character comply with the rule, replace the first character with the second character that complies with the rule, and cause the touch panel-equipped display to display the characters.

8. The input apparatus according to claim 7, wherein the processor causes the touch panel-equipped display to display the replaced second character in a manner such that the replaced second character is distinguished from the other characters.

9. The input apparatus according to claim 1, wherein the rule that defines an order of numerical characters, characters corresponding to variables, and mathematical symbols is prepared for each of a plurality of mathematical notations at least including infix notation, Polish notation, and Reverse Polish notation.

10. The input apparatus according to claim 1, wherein the rule includes a rule that restricts usable mathematical symbols.

11. The input apparatus according to claim 10, wherein the rule includes a rule that restricts usable mathematical symbols for each learning level.

12. The input apparatus according to claim 1, wherein the processor is configured to:
- determine whether or not an order of characters obtained by the character recognition is a mathematical expression that includes a mathematical symbol,
- if it is determined that an order of the characters corresponds to a mathematical expression, replace any of the characters based on a result of the determination.

13. An input method, the method comprising:
- performing, by a processor, character recognition on trajectory data that is input by handwriting; and
- determining by the processor whether or not a plurality of characters obtained by the character recognition, except for a first character at any position in a sequence of the characters, comply with a rule relating to mathematical representations, and if the plurality of characters except for the first character comply with the rule, replacing by the apparatus the first character with a second character that complies with the rule, wherein:
- the rule includes a rule that defines an order of numerical characters, characters corresponding to variables, and mathematical symbols; and
- the rule defines an order of a character on a left side, a mathematical symbol, and a character on a right side in a mathematical representation, and includes at least one of the following:
- a rule that different numbers on a left side and a right side are not connected by an equal sign (=);
- a rule that different numbers on a left side and a right side may be connected by a congruence symbol (≡);
- a rule that a variable may be placed on a left side of an equation;
- a rule that a left side and a right side of an equation are not connected by an angle sign (∠); and
- a rule that a left side and a right side of an equation may be connected by an unequal sign (≠).

14. A non-transitory storage medium having stored thereon a program that is executable by a computer to control the computer to:
- perform character recognition on trajectory data that is input by handwriting; and
- determine whether or not a plurality of characters obtained by the character recognition, except for a first character at any position in a sequence of the characters, comply with a rule relating to mathematical representations, and if the plurality of characters except for the first character comply with the rule, replace the first character with a second character that complies with the rule, wherein:
- the rule includes a rule that defines an order of numerical characters, characters corresponding to variables, and mathematical symbols; and
- the rule defines an order of a character on a left side, a mathematical symbol, and a character on a right side in a mathematical representation, and includes at least one of the following:
- a rule that different numbers on a left side and a right side are not connected by an equal sign (=);
- a rule that different numbers on a left side and a right side may be connected by a congruence symbol (≡);
- a rule that a variable may be placed on a left side of an equation;
- a rule that a left side and a right side of an equation are not connected by an angle sign (∠); and
- a rule that a left side and a right side of an equation may be connected by an unequal sign (≠).

15. An input apparatus comprising:
a processor that is configured to:
- perform character recognition on trajectory data that is input by handwriting; and
- determine whether or not a plurality of characters obtained by the character recognition, except for a first character at any position in a sequence of the characters, comply with a rule relating to mathematical representations, and if the plurality of characters except for the first character comply with the rule, replace the first character with a second character that complies with the rule,
wherein the rule includes a rule that restricts usable mathematical symbols for each of a plurality of learning levels for mathematics.

* * * * *